(12) United States Patent
Mosebach et al.

(10) Patent No.: US 11,311,142 B2
(45) Date of Patent: Apr. 26, 2022

(54) FOOD PROCESSOR WITH BOILING POINT RECOGNITION

(71) Applicant: Vorwerk & Co. Interholding GmbH, Wuppertal (DE)

(72) Inventors: Andrej Mosebach, Bochum (DE); Wenjie Yan, Düsseldorf (DE); Sebastian Tietz, Leverkusen (DE); Stefan Kraut-Reinkober, Leverkusen (DE); Michael Sickert, Ennepetal (DE)

(73) Assignee: Vorwerk & Co. Interholding GmbH

( * ) Notice: Subject to any disclaimer, the term of this patent is extended or adjusted under 35 U.S.C. 154(b) by 0 days.

(21) Appl. No.: 16/827,173

(22) Filed: Mar. 23, 2020

(65) Prior Publication Data

US 2020/0305639 A1  Oct. 1, 2020

(30) Foreign Application Priority Data

Mar. 29, 2019  (EP) .................... 19166082

(51) Int. Cl.
*A47J 36/32*  (2006.01)
*A23L 5/10*  (2016.01)
(Continued)

(52) U.S. Cl.
CPC ............. *A47J 36/32* (2013.01); *A23L 5/15* (2016.08); *A47J 27/004* (2013.01);
(Continued)

(58) Field of Classification Search
CPC ...... A47J 36/32; A47J 27/004; A47J 43/0716; A47J 2202/00; A47J 27/21–64; A47J 31/54–56; G01K 2207/02–08
(Continued)

(56) References Cited

FOREIGN PATENT DOCUMENTS

DE  102013106691 A1 *  1/2014  ............. A47J 44/02
DE  102013106691 A1     1/2014
(Continued)

OTHER PUBLICATIONS

The Study of Phase Change (Theory): Heat & Thermodynamics Virtual Lab : Physical Sciences : Amrita Vishwa Vidyapeetham Virtual Lab https://web.archive.org/web/20160917130617/https://vlab.amrita.edu/index.php?sub=1&brch=194&sim=709&cnt=1 (Year: 2016).*

*Primary Examiner* — Drew E Becker
*Assistant Examiner* — Austin Parker Taylor
(74) *Attorney, Agent, or Firm* — Barnes & Thornburg LLP

(57) ABSTRACT

The present disclosure relates to a food processor for preparing a food in a pot. The food processor comprises the pot, a heating element for heating the pot or a food in the pot, and a temperature sensor for detecting a temperature $T_{SUR}$, $T_{MED}$ of the pot or a food in the pot. The food processor comprises a monitoring device which is configured such that the monitoring device can detect an exceeding of a boiling point SP of a food in the pot on the basis of a temperature measurement value $T_{NTC}(k)$ of the temperature sensor and an electrical measurement value u(k), which depends on an energy supply to the heating element. Furthermore, the present disclosure relates to a process and a computer program product. A food processor with boiling point detection can thus be made available with particularly low production effort.

14 Claims, 4 Drawing Sheets

Figure 1:
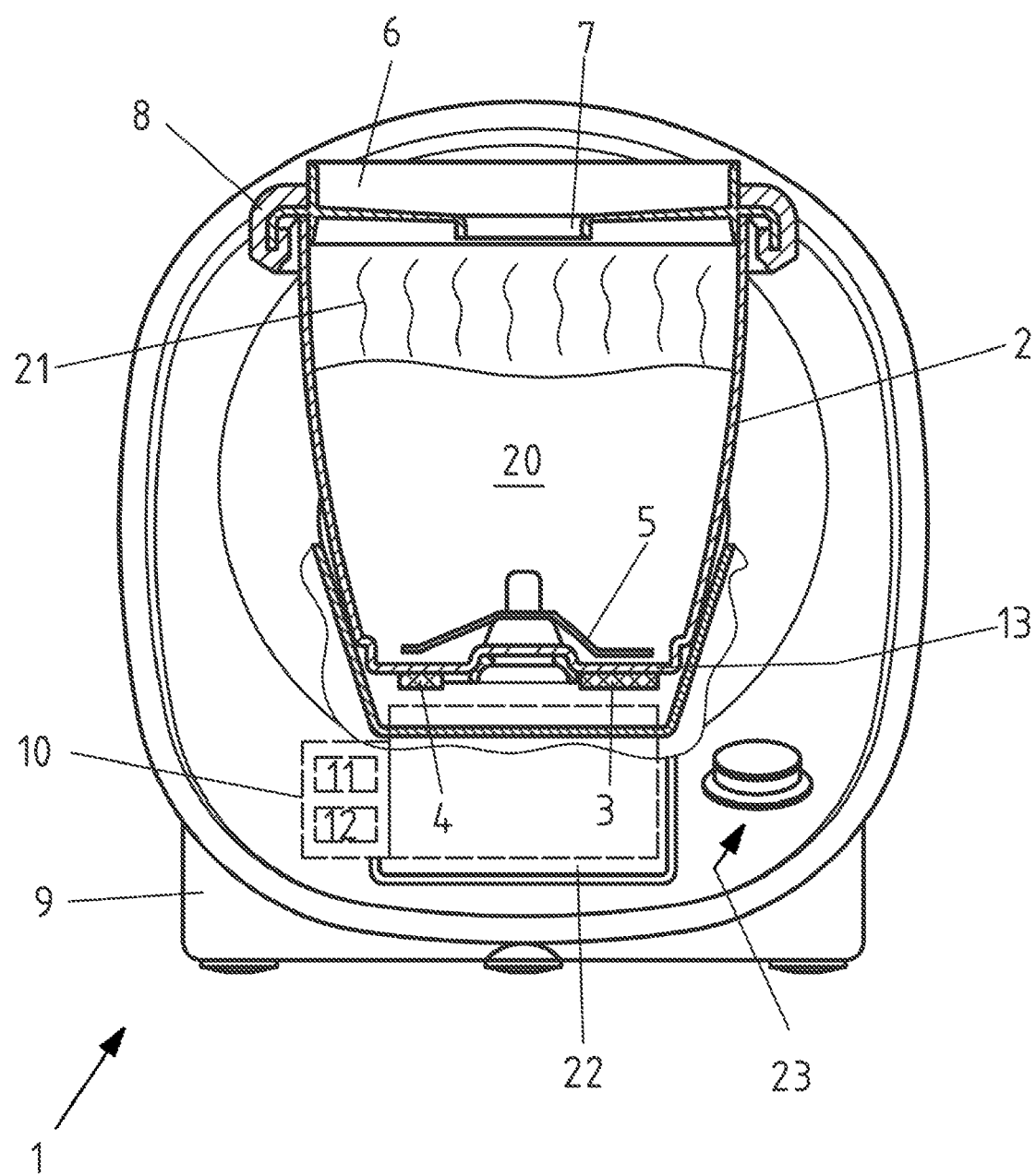

(51) Int. Cl.
  *A47J 27/00* (2006.01)
  *A47J 43/07* (2006.01)
  *A47J 27/21* (2006.01)
(52) U.S. Cl.
  CPC ....... *A47J 43/0716* (2013.01); *A23V 2002/00* (2013.01); *A47J 27/21* (2013.01); *A47J 2202/00* (2013.01)
(58) Field of Classification Search
  USPC .................................... 99/325; 374/21, 16
  See application file for complete search history.

(56) References Cited

FOREIGN PATENT DOCUMENTS

| EP | 1412830 B1 | * | 11/2005 | ........ A47J 27/21083 |
|---|---|---|---|---|
| JP | H10149875 A | * | 6/1998 | |
| JP | 2002048343 A | * | 2/2002 | |
| JP | 2015088356 A | * | 5/2015 | |

* cited by examiner

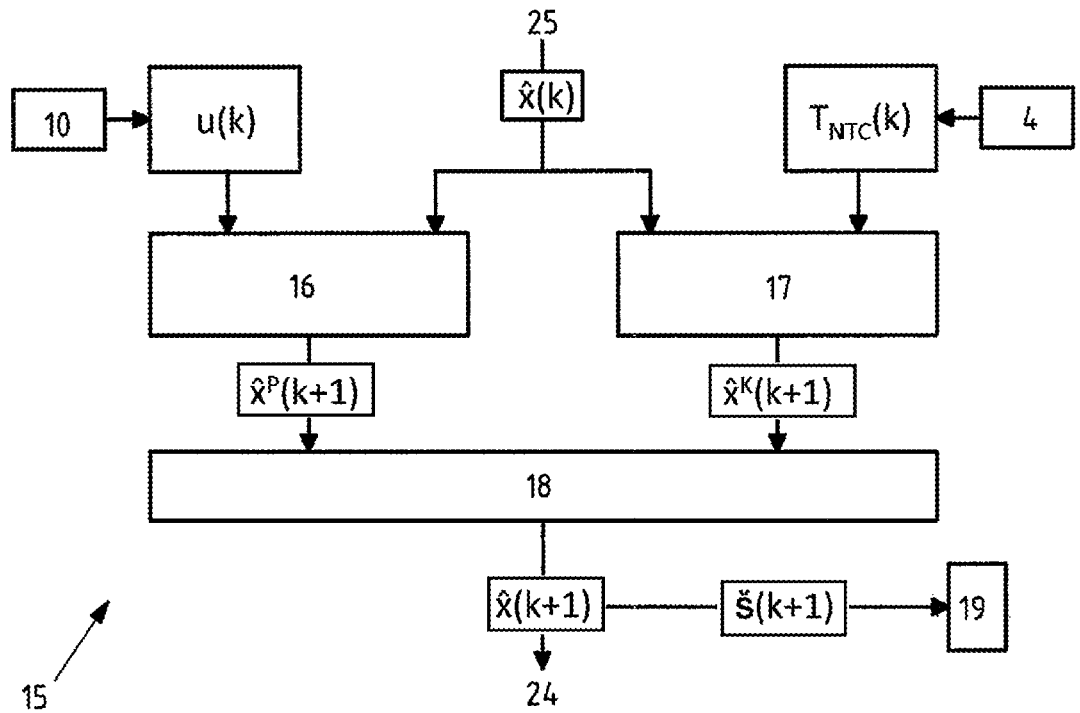

FIG.2

$$\hat{x}(k) = (\check{T}_{NTC}(k), \quad \check{T}_{SUR}(k), \quad \check{T}_{MED}(k), \quad \check{S}(k) \quad )$$

$$\hat{x}^P(k+1) = (\check{T}^P_{NTC}(k+1), \quad \check{T}^P_{SUR}(k+1), \quad \check{T}^P_{MED}(k+1), \quad \check{S}^P(k+1) )$$

$$\hat{x}^K(k+1) = (\check{T}^K_{NTC}(k+1), \quad \check{T}^K_{SUR}(k+1), \quad \check{T}^K_{MED}(k+1), \quad \check{S}^K(k+1) )$$

$$\hat{x}(k+1) = (\check{T}_{NTC}(k+1), \quad \check{T}_{SUR}(k+1), \quad \check{T}_{MED}(k+1), \quad \check{S}(k+1) )$$

FIG.3

16:
$$\check{T}^P_{NTC}(k+1) = \check{T}_{NTC}(k) + h(a_1(\check{T}_{SUR}(k) - \check{T}_{NTC}(k)) + b_1 u(k))$$

$$\check{T}^P_{SUR}(k+1) = \check{T}_{SUR}(k) + h(a_3(c_1 \check{T}_{MED}(k) - \check{T}_{SUR}(k)) - a_2 \check{T}_{SUR}(k) + b_2 u(k)) - \check{s}(k)$$

$$\check{T}^P_{MED}(k+1) = \check{T}_{MED}(k) + h(c_2 a_3(\check{T}_{SUR}(k) - c_1 \check{T}_{MED}(k)) - a_4 \check{T}_{MED}(k))$$

$$\check{s}^P(k+1) = \check{s}(k)$$

FIG.4a

17:
$$\check{T}^K_{NTC}(k+1) = l_1 (T_{NTC}(k) - \check{T}_{NTC}(k))$$

$$\check{T}^K_{SUR}(k+1) = l_2 (T_{NTC}(k) - \check{T}_{NTC}(k))$$

$$\check{T}^K_{MED}(k+1) = l_3 (T_{NTC}(k) - \check{T}_{NTC}(k))$$

$$\check{s}^K(k+1) = l_4 (T_{NTC}(k) - \check{T}_{NTC}(k))$$

FIG.4b

18:
$$\check{T}_{NTC}(k+1) = \check{T}^P_{NTC}(k+1) + \check{T}^K_{NTC}(k+1)$$

$$\check{T}_{SUR}(k+1) = \check{T}^P_{SUR}(k+1) + \check{T}^K_{SUR}(k+1)$$

$$\check{T}_{MED}(k+1) = \check{T}^P_{MED}(k+1) + \check{T}^K_{MED}(k+1)$$

$$\check{s}(k+1) = \check{s}^P(k+1) + \check{s}^K(k+1)$$

FIG.4c

FOOD PROCESSOR WITH BOILING POINT RECOGNITION

FIELD OF THE DISCLOSURE

The present disclosure relates to a food processor for preparing a food in a pot. The food processor comprises the pot, a heating element for heating the pot or a food in the pot and a temperature sensor for detecting a temperature of the pot or a food in the pot. The present disclosure further relates to a method.

BACKGROUND

In the preparation of a food the boiling state is of particular importance. For example, the quality of the cooking result can suffer if a food is cooked too long above the boiling point. For a stove, it is known from the publications U.S. Pat. Nos. 9,675,199 and 8,791,399 that boiling of water can be detected with a microphone and an analysis of the microphone signal. The Senseboil© system from AEG uses an acceleration sensor for this purpose. However, this is also a stove and not a food processor.

A food processor for preparing a food in a pot of the food processor typically has a heating element and a temperature sensor. In addition, a mixing tool is generally provided for mixing and/or chopping the food in the pot. The addition of additional sensors or components for special extra functions generally increases the production effort.

It is the task of the present disclosure to provide a further developed food processor.

SUMMARY

A food processor according to the present disclosure comprises the pot, a heating element for heating the pot or a food in the pot, and a temperature sensor for determining a temperature of the pot or a food in the pot. In some embodiments, the food processor comprises a monitoring device configured such that the monitoring device can detect an exceeding of a boiling point of a food in the pot on the basis of a temperature measurement value of the temperature sensor and an electrical measurement value, which depends on an energy supply to the heating element. A food processor with boiling point detection can thus be provided with particularly low production effort. Additional sensors or components, which are not normally provided for a food processor with heating element and temperature sensor, are not required.

In the following, exemplary implementations explained in more detail using figures. Features of the exemplary implementations can be combined individually or in a plurality with the claimed objects, unless otherwise indicated. The claimed scopes of protection are not limited to the exemplary implementations.

BRIEF DESCRIPTIONS OF THE DRAWINGS

Figure 5:
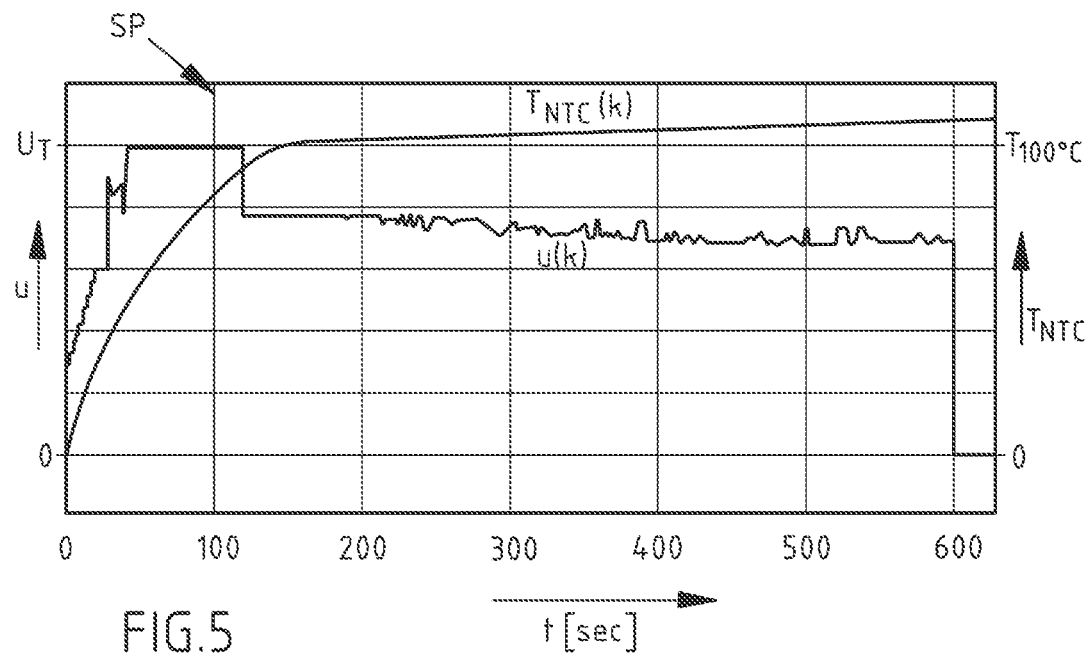

FIG. 1: Schematic representation of a food processor;

FIG. 2: Flow chart for determining a disturbance variable value;

FIG. 3: Exemplary output variables and input variables of the FIG. 2;

FIG. 4a: System of equations of the predicted value determination unit;

FIG. 4b: System of equations of the correction value determination unit;

FIG. 4c: System of equations of the estimated value determination unit;

FIG. 5: Measured curves of the temperature measurement value and the electrical measurement value; and FIG. 6: Course of the disturbance variable values over time, determined on the basis of the temperature measurement values and the electrical measurement values of FIG. 5 according to the flow chart of FIG. 2.

DETAILED DESCRIPTION

FIG. 1 shows a food processor 1 with a pot 2 for receiving a food 20 that contains liquid components or is liquid. The pot 2 can be covered by a lid 6 with a lid opening 7. An opening cover not shown can be provided to loosely cover the lid opening 7 so that steam 21 can always escape from the pot 2. The lid 6 can be locked on the pot by means of a lock 8. A rotatable tool 5 for chopping and/or mixing is provided at the bottom of the pot 13. A housing 9 of the food processor 1 provides stably receives the pot 2. A display 22 and a user interface 23 enable interaction with a user. A control device 10 with a processor 11 and a memory 12 are provided to control the food processor. A heating element 3 and a temperature sensor 4 are disposed, in particular on an underside of the bottom of the pot, which normally does not come into contact with food, preferably approximately halfway between a central point of the bottom of the pot and an outer perimeter. Preferably the heating element 3 and/or the temperature sensor 4 are in direct contact with the pot 2, especially with the pot bottom 13. Preferably the heating element 3 and the temperature sensor 4 are placed opposite each other on both sides of the center of the pot bottom. The pot 2 is made of metal. Preferably the temperature sensor 4 is a thermistor with negative temperature coefficient.

During normal heating of a liquid food 20 in the pot 2 without massive evaporation, the supply of heat output by heating element 3 causes an increase in the temperature of the food. When the food 20 is heated in the pot 2 to a temperature where the liquid components of the food 20 reach their boiling point, the further supplied heat output is completely converted into mass transport and/or phase transformation from liquid to vaporous while the temperature remains constant. As a result, the liquid evaporates. This spontaneous change in energy conversion is used as described in the following to detect boiling of liquid components of the food 20.

FIG. 2 shows a flow chart implemented in a monitoring device 15. The monitoring device 15 comprises a predicted value determination unit 16, a correction value determination unit 17 and an estimated value determination unit 18, which are used as shown in FIG. 2 to determine an estimated disturbance variable value š(k+1). The system of equations and/or the algorithm described by the flow chart (in particular in combination with the formulae of FIGS. 3, 4a, 4b and 4c) is run through for a current cycle k. At the beginning 25 of the flowchart, the estimated output variables of the previous cycle correspond to the input variables x̂(k) of the current cycle. In addition, for a current cycle k a temperature measurement value $T_{NTC}(k)$ of the temperature sensor 4 and an electrical measurement value u(k), preferably the current operating power of the heating element 3, are transmitted or made available from the control device 10 to the monitoring device 15. The electrical measurement value u(k) represents an input variable for the predicted value determination unit 16 and/or the temperature measurement value $T_{NTC}(k)$ represents an input variable for the correction value determination unit 17. Of the estimated input variables x̂(k) determined in the previous cycle k−1, in particular the estimated temperature measurement value $\check{T}_{NTC}(k)$, the estimated pot temperature value $\check{T}_{SUR}(k)$ and/or the estimated food temperature value $\check{T}_{MED}(k)$ represent input variables for the predicted value determination unit 16, as shown in FIGS. 3 and 4a. Of the estimated input variables $\hat{x}(k)$ determined in the previous cycle k−1, in particular the estimated temperature measurement value $\check{T}_{NTC}(k)$ is an input variable for the correction value determination unit 17, as shown in FIGS. 3 and 4b. The predicted output variables $\hat{x}^P(k+1)$ determined by the predicted value determination unit 16 and the correction output variables $\hat{x}^K(k+1)$ determined by the correction value determination unit 17, which are exemplarily shown in FIG. 3, represent the input variables for the estimated value determination unit 18. By running through the system of equations and/or the algorithm, the estimated output variables $\hat{x}(k+1)$ are determined for the next cycle k+1. The estimated output variables $\hat{x}(k+1)$, which in particular contains in a vector-like manner a set of different elements as output variables, are calculated by the estimated value determination unit 18. Before the end 24 of the current cycle k, the estimated disturbance variable value $\check{s}(k+1)$, which is an element of the set $\hat{x}(k+1)$, is transmitted to the monitoring unit 19 in order to perform on the basis of the estimated disturbance variable value $\check{s}(k+1)$ a boiling point detection and, alternatively or additionally, a vapor rate determination for the current cycle k. At the end 24 of the flow chart the estimated output variables $\hat{x}(k+1)$ form the input variables of the next cycle k+1 and the same algorithm and/or system of equations is run through again. Thus, in the next cycle k+1 an estimated disturbance variable value $\check{s}(k+2)$ is calculated and used for monitoring by the monitoring unit 19 of the next cycle k+1. When starting the food processor 1 or when beginning a food preparation process, predefined, stored initial values $\hat{x}(0)$ are used for the very first cycle instead of the estimated output variables $\hat{x}(k)$ of the previous cycle k−1.

FIG. 3 shows exemplary predicted output variables $\hat{x}^P(k+1)$, correction output variables $\hat{x}^K(k+1)$, and estimated output variables $\hat{x}(k)$ of the previous cycle and estimated output variables $\hat{x}(k+1)$ of the current cycle k. The individual elements are described in more detail in FIGS. 4a, 4b and 4c.

Figure 6:
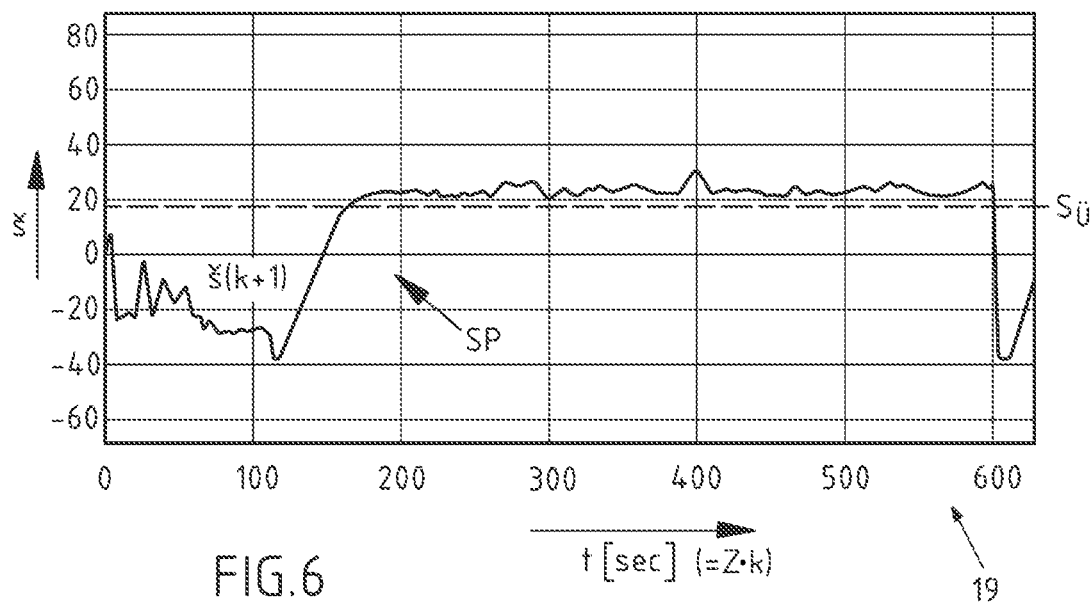

The formulae in FIGS. 4a, 4b and 4c reflect a mathematical model which describes the relationship between the supplied heat output in the form of the electrical measurement value u(k), the temperature measurement value $T_{NTC}(k)$ of the temperature sensor 4, a temperature at the bottom surface of the pot $T_{SUR}(k)$, the food temperature $T_{MED}(k)$ and a heat loss in the form of a disturbance measurement value $\check{s}(k)$, which, as shown in FIG. 6, is in particular abrupt in the case of exceeding the boiling point SP. In a food preparation process where the liquid food does not boil, the disturbance variable value $\check{s}(k)$ is zero. When the temperature of the food reaches the boiling point or the boiling temperature, the heat output is regularly completely extracted from the system by the boiling process, which is described by a disturbance variable value $\check{s}(k)$ that is other than zero. Preferably, the mathematical model to describe this simplified physical system is implemented in the predicted value determination unit.

As FIG. 4a shows, the predicted temperature measurement value $\check{T}^P_{NTC}(k+1)$ is determined starting from the previously estimated temperature measurement value $\check{T}_{NTC}(k)$, taking into account the heat supply by the heating element by means of the electrical measurement value u(k) and a heat exchange between the temperature sensor 4 and the pot 2 at their interface by means of the temperature difference $\check{T}_{SUR}(k)-\check{T}_{NTC}(k)$. The other formulas are analogously structured and always start from the respective, previously estimated temperature and take into account the different influences from heat supply directly or indirectly via the heating element 3, influences from a heat exchange at an interface as well as influences from heat emission to the environment. The coefficients a1, a2, a3, a4, b1, b2, c1, c2 and h are provided accordingly to take into account parameters such as thermal conductivity, heat transfer coefficients, square measure and/or volume, which depend on the structure of the pot bottom 13 and the properties of the food.

The boiling of liquid food 20 can be detected by first predicting the overall condition of the pot 2 by the predicted value determination unit 16. Then the measured temperature measurement value $T_{NTC}(k)$ is compared with the predicted temperature measurement value $\check{T}_{NTC}(k)$ by the correction value determination unit 17 and corresponding deviations are provided as correction output variables $\hat{x}^K(k+1)$, which are used in the next step by the estimated value determination unit 18 to correct the predicted values of the predicted value determination unit 16. The coefficients $I_1$, $I_2$, $I_3$ and $I_4$ weight the influence of the softening (deviation) on the respective correction temperature value $\check{T}^K_{NTC}$, $\check{T}^K_{SUR}$, $\check{T}^K_{MED}$, and the correction disturbance variable value $\check{s}^K$.

By repeating this procedure and running through the flow chart of FIG. 2 for a large number of cycles over time, the deviations between the behavior of the real system and the system model of the predicted value determination unit 16 gradually become smaller and the predicted temperatures of the predicted value determination unit 16 consequently come closer and closer to the real system. Also the not measured temperatures $T_{SUR}$ of the pot 2 or the pot bottom 13 and $T_{MED}$ of the food can be calculated approximately, i.e. estimated, by the procedure described above. Based on a kind of calculated estimate of the disturbance variable value $\check{s}(k+1)$ it can be determined whether heat energy is extracted from the system which does not lead to an increase of the temperature measurement value $T_{NTC}$, which indicates a boiling of the food 20 and thus an exceeding of the boiling point.

FIG. 5 shows an exemplary process in which 200 g of water is heated as the food 20 to a temperature of 105° C. Boiling starts from a boiling temperature $T_{100° C.}$ of 100° C. In the course of the experiment the water started boiling approximately at time t=120 seconds. For this purpose, the operating current supplied to the heating element was initially increased to the value $u_T$ and then lowered again slightly approximately at boiling point SP.

FIG. 6 shows the determined estimated disturbance variable value $\check{s}(k+1)$ over time t for the experiment in FIG. 5. The time interval Z between two consecutive cycles k is so small that the individual estimated disturbance variable values $\check{s}(k+1)$ form a continuous curve. As in FIG. 5, the time t is equal to the product of the time interval Z and the cycle k. When exceeding the boiling point SP, as marked by the arrow in FIG. 6, it can be clearly seen that there is an abrupt energy extraction in the system. Therefore, using a threshold value $S_Ü$, the exceeding of the boiling point can be recognized with little effort. Alternatively or additionally, the amplitude of the signal of the estimated disturbance variable value $\check{s}(k+1)$ can be used to determine the correlating vapor rate. The larger the amplitude, the higher is the steam rate.

If the monitoring device 15 described above would describe the system behavior completely and without errors, then the estimated disturbance variable value $\check{s}(k+1)$ would basically be zero up to the time of boiling and could jump to a fixed value greater than 0 at the time of boiling. However, since the model does not describe the physical behavior completely and there is an error, the visible deviations and fluctuations in the curve of FIG. 6 occur. As can be seen, the detection of the exceeding of the boiling point works despite the existing deviations and errors. The reason is that the influence of the energy extraction during boiling is greater than the effect of the deviations and errors.

In one configuration the control device 10 is configured such that, depending on the detected time of exceeding the boiling point, an automatic change of a target temperature is performed, the user is prompted via the display 22 to add a specific ingredient and/or to stop the food preparation process. In particular, stored recipes can be executed with an increased degree of automation. It is also possible to set a specific boiling intensity (steam rate) and/or to stop the cooking process without knowing the amount of food in pot 2 at a time that effects a particularly high quality of the cooking result.

No additional sensors or mechanical components are required for the functionalities described above, so that a food processor with boiling point monitoring and/or steam rate determination can be provided with particularly low production effort.

A food processor according to the present disclosure differs from a stove or other electrical household appliance in the kitchen area in that a food processor comprises its own pot. Furthermore, a food processor implies the presence of a tool of the food processor for processing a food in the pot, e.g. for mixing and/or chopping.

In particular, the temperature sensor and/or the heating element are attached directly to the pot, i.e. there is a direct contact. In the case of the heating element the pot can thus be heated very efficiently. In the case of the temperature sensor, the temperature measurement value can be used to reliably determine, i.e. to calculate, the temperature of the pot or the food in the pot.

In particular, the temperature measurement value and/or the electrical measurement value are provided in a defined and/or constant time interval. Preferably the electrical measurement value describes the electrical power or the current of the electrical energy that is supplied to the heating element and/or consumed by the heating element for heating. In particular, the control device (monitoring device) controls the energy supply to the heating element and/or provides the electrical measurement value. The temperature measurement value and/or the electrical measurement value can be an analog or digital signal which has preferably undergone signal processing. The time interval results in particular from a sampling rate, for example of the temperature sensor, and/or from an operating frequency, for example of the control device (monitoring device). A sampling rate of the temperature sensor is preferably equal to an operating frequency of the control device (monitoring device).

Detecting the exceeding of a boiling point of a food gives an indication that the boiling point at the time of detection has been exceeded after the boiling point had not been reached before. Food means an at least partially liquid food. When the boiling point is exceeded, liquid components of the food evaporate.

Boiling point means, as is well known, that from the boiling point a change takes place e.g. from a liquid phase to a vapor phase. In a food processor the boiling point is generally the normal boiling point, i.e. the boiling point at approx. 1 bar. The boiling point for water is about 100° C.

The monitoring device can detect an exceeding of a boiling point of a food in the pot on the basis of the temperature measurement value and the electrical measurement value, i.e., the temperature measurement value and the electrical measurement value are input variables for the monitoring device.

In one embodiment the monitoring device determines from the temperature measurement value and the electrical measurement value a disturbance variable value, which correlates with a heat loss. The heat loss, on which the disturbance variable value depends, is caused by a boiling of a food in the pot, i.e. by exceeding a boiling point. A boiling point monitoring can therefore be carried out on the basis of a calculated value and the food processor can be provided with low production effort. Heat loss means that energy is supplied for heating, but because of a phase transformation does not heat up or does not heat up accordingly.

As long as no liquid component of the food boils during a food preparation, no heat loss is caused by boiling and the disturbance variable value is zero. When the temperature of a liquid component of the food reaches the boiling point (i.e. the boiling temperature), the heat output of the heating element, which is then further supplied to the pot and/or food by the heating element, is extracted by boiling. Basically, it can happen that after the boiling point is exceeded, the entire further supplied heat output of the heating element is extracted again by the boiling. In this case the supplied heat output is basically completely used or consumed for the phase transformation from a liquid phase into a vapor phase of a liquid component of the food.

The heat output extracted by boiling is the heat loss with which the disturbance variable value correlates. The disturbance variable value therefore has a value other than zero after the boiling point has been exceeded. In the following, a change in the disturbance variable value starting from zero as a result of heat loss due to boiling is referred to as an increase. Depending on the signal processing and the selected multipliers and their signs, the increase and an exceeding of a boiling point can be directed in the direction of increasing positive values as well as in the opposite direction of a value scale.

In one embodiment, the monitoring device or a monitoring unit of the monitoring device monitors the disturbance variable value to detect an exceeding of the boiling point of a food in the pot. A food processor can thus be produced with very little effort. In particular, the monitoring is performed using a threshold value, so that an exceeding of the boiling point is detected when the disturbance variable value reaches the threshold value.

In one embodiment the disturbance variable value is ideally zero if the boiling point is not exceeded. The heat supply by the heating element then leads to a temperature that approximately occurs if no heat loss occurs due to boiling. Ideally means that errors from external influences and other deviations between theory and practice have been excluded from this consideration or have been taken into account by parameters without errors.

In one embodiment, the monitoring device represents, using an algorithm or a system of equations, a thermal system in which a heat supply through the heating element leads to an increase in the temperature minus the disturbance variable value. Boiling point detection is thus possible with little effort. The heat supply through the heating element is described by the electrical measurement value, which depends on an energy supply to the heating element. The increase in temperature corresponds to a change that can be determined from two temporally successive temperature measurement values, in particular by difference formation.

Input variables can be entered into the system of equations and/or the algorithm and at least one output variable can be obtained based on the input variables. The input variables are variables that are replaced with numerical values during use. Using the system of equations and/or the algorithm, a numerical value for the output variable is obtained on the basis of the numerical values of the input variables. In one configuration, the system of equations and/or the algorithm comprises a large number of coefficients. Preferably, all or a vast number of the input variables are multiplicatively linked with their own coefficient. Preferably there are further coefficients which are multiplicatively linked with a formed difference of two input variables. In particular, the coefficients are system parameters for a heat conductivity, a heat transfer, a specific heat capacity, a square measure, for example of the pot bottom, and/or a volume, for example of a space defined by the pot. Preferably the coefficients are fixed and are not changed during use. In one configuration at least one coefficient is provided which can be adapted to a cooking process.

In particular, the thermal system is defined in such a way that a supplied heat output by the heating element leads to a temperature increase of the pot and/or the food in the pot. External influences are taken into account in the system either by parameters or excluded from consideration. External influences are e.g. a heat extraction by a cooler environment or a heat supply by adding an already heated ingredient to the pot.

In one embodiment, the algorithm or system of equations is applied in temporally successive cycles. This allows the use of output variables of a current cycle as input variables for a next cycle. The effort to provide a food processor with boiling point detection can thus be reduced. In particular, the time difference between two cycles corresponds to the time interval mentioned above.

In one embodiment the temperature measurement value of a current cycle and the electrical measurement value of a current cycle and a disturbance variable value, determined in the preceding cycle using the algorithm or system of equations, are used as input variables for determining the disturbance variable value monitored in the current cycle to detect an exceeding of the boiling point of a food in the pot, in particular by the monitoring unit. A boiling point detection is thus possible with little effort. In particular, the disturbance variable value monitored in the current cycle and the disturbance variable value determined in the preceding cycle have been calculated by the same algorithm or the same system of equations.

In one embodiment, the monitoring device comprises a predicted value determination unit which determines a predicted disturbance variable value, a predicted temperature measurement value, a predicted pot temperature value and/or a predicted food temperature value as predicted output variables. By providing several predicted output variables, the system can be better represented and a food processor with low production effort can be obtained. In particular, the predicted disturbance variable value of the next cycle is set equal to the predicted disturbance variable value of the current cycle, that is, $\check{s}^P(k+1)=\check{s}(k)$. In particular, the predicted temperature measurement value $\check{T}^P_{NTC}(k+1)$ of the next cycle k+1 is determined on the basis of the electrical measurement value u(k) of the current cycle k and/or input variables only of the current cycle k. Preferably the input variables are a predicted temperature measurement value $\check{T}_{NTC}(k)$ and/or a difference $\check{T}_{SUR}(k)-\check{T}_{NTC}(k)$ of an estimated pot temperature value $\check{T}_{SUR}(k)$ and the estimated temperature measurement value $\check{T}_{NTC}(k)$.

In one embodiment, the monitoring device comprises a correction value determination unit which determines a correction disturbance variable value ($\check{s}^K(k+1)$), a correction temperature measurement value ($\check{T}^K_{NTC}(k+1)$), a correction pot temperature value ($\check{T}^K_{SUR}(k+1)$) and/or a correction food temperature value ($\check{T}^K_{MED}(k+1)$) as correction output variables. By means of the correction value determination unit, a disturbance variable value $\check{s}(k+1)$ adapted to the actual conditions of the system is used for monitoring and a boiling point detection with low effort is obtained. In particular, the correction disturbance variable value of the next cycle and/or all correction output variables of the next cycle k+1 are determined on the basis of the temperature measurement value $T_{NTC}(k)$ of the current cycle k and/or input variables only of the current cycle k. Preferably an input variable is an estimated temperature measurement value $\check{T}_{NTC}(k)$. Preferably all correction output variables are calculated based on a difference $T_{NTC}(k)-\check{T}_{NTC}(k)$ of the temperature measurement value $T_{NTC}(k)$ and the estimated temperature measurement value $\check{T}_{NTC}(k)$.

In one embodiment, the monitoring device comprises an estimated value determination unit which determines an estimated disturbance variable value $\check{s}(k+1)$, an estimated temperature measurement value $\check{T}_{NTC}(k+1)$, an estimated pot temperature value $\check{T}_{SUR}(k+1)$ and/or an estimated food temperature value $\check{T}_{MED}(k+1)$ as estimated output variables. In particular, all input variables and/or all estimated output variables are of the next cycle k+1. The estimated output variables of the estimated value determination unit thus form input variables for the next cycle, in particular for the predication value determination unit and/or the correction value determination unit. Preferably, the estimated temperature measurement value $\check{T}_{NTC}(k+1)$ is determined on the basis of the predicted temperature measurement value $\check{T}^P_{NTC}(k+1)$ and the correction temperature measurement value $\check{T}^K_{NTC}(k+1)$, in particular by forming the sum of the aforementioned two input variables. Preferably, the estimated pot temperature value $\check{T}_{SUR}(k+1)$ is determined on the basis of the predicted pot temperature value $\check{T}^P_{SUR}(k+1)$ and the correction pot temperature value $\check{T}^K_{SUR}(k+1)$, in particular by forming the sum of the aforementioned two input variables. Preferably, the estimated food temperature value $\check{T}_{MED}(k+1)$ is determined on the basis of the predicted food temperature value $\check{T}^P_{MED}(k+1)$ and the correction food temperature value $\check{T}^K_{MED}(k+1)$, in particular by forming the sum of the aforementioned two input variables.

In one embodiment the disturbance variable value is the estimated disturbance variable value $\check{s}(k+1)$. The disturbance variable value, which is monitored to detect an exceeding of the boiling point, was thus calculated by the estimated value determination unit. Preferably, the estimated disturbance variable value $\check{s}(k+1)$ for the next cycle, which is used for monitoring by the monitoring unit in the current cycle, is determined by the estimated value determination unit by summing the predicted temperature measurement value $\check{T}^P_{NTC}(k+1)$ of the predicted value determination unit and the correction temperature measurement value $\check{T}^K_{NTC}(k+1)$ of the correction value determination unit.

In one embodiment the at least one predicted output variable $\hat{x}^P(k+1)$ of the predicted value determination unit and/or the at least one correction output variable $\hat{x}^K(k+1)$ of the correction value determination unit forms the at least one input variable for the estimated value determination unit. Preferably, several predicted output variables $\hat{x}^P(k+1)$ and/or several correction output variables $\hat{x}^K(k+1)$ are provided. Several predicted output variables $\hat{x}^P$ and/or several correction output variables $\hat{x}^K$ and/or several estimated output variables x̂, respectively, form a set of output variable values. Such a set can (in linear algebra) be referred to as a vector that contains several values as elements.

In one embodiment, the disturbance variable value š(k+1) corresponds to a sum of the predicted disturbance variable value š$^P$(k+1) and the correction disturbance variable value š$^K$(k+1). A boiling point recognition can thus be realized with little effort.

In one embodiment, the monitoring device comprises a monitoring unit which is configured such that the monitoring unit monitors the disturbance variable value for detecting an exceeding of the boiling point and/or determines a steam rate on the basis of the disturbance variable value. A food processor with a monitoring of the boiling of a food during food preparation can thus be produced with little effort.

A steam rate indicates the amount of steam released by the food in the pot per time unit.

In particular, the determination of the steam rate is performed by the monitoring unit. Preferably, the steam rate is determined by means of an amplitude of the disturbance variable value. This configuration is based on the finding that the amplitude of the disturbance variable value correlates with the steam rate.

In one configuration the monitoring unit is configured such that the monitoring unit detects reaching of the boiling point by calculating a derivative of the disturbance variable value over time and comparing it with a desired profile. In one configuration, the desired profile is defined in such a way that an exceeding of the boiling point is detected if the derivative of the disturbance variable value is above a lower limit for a minimum period of time.

A further aspect of the present disclosure relates to a food processor for preparing a food in a pot. The food processor comprises the pot, a heating element for heating the pot or a food in the pot and a temperature sensor for detecting a temperature of the pot or a food in the pot. According to the present disclosure, the food processor comprises a monitoring device configured such that the monitoring device determines a steam rate of a food in the pot on the basis of a temperature measurement value of the temperature sensor and an electrical measurement value, which depends on an energy supply to the heating element. Features of the entire description can also be applied to this aspect of the present disclosure.

A further aspect of the present disclosure relates to a method for monitoring a preparation of a food in a pot using a food processor comprising the pot, a heating element for heating the pot or a food in the pot and a temperature sensor for determining a temperature of the pot or a food in the pot. According to the present disclosure, a monitoring device of the food processor determines a steam rate of a food in the pot on the basis of the temperature measurement value of the temperature sensor and the electrical measurement value, which depends on an energy supply to the heating element. Alternatively or additionally, a monitoring device of the food processor detects an exceeding of a boiling point of a food in the pot on the basis of a temperature measurement value of the temperature sensor and an electrical measurement value, which depends on an energy supply to the heating element.

A further aspect of the present disclosure relates to a computer program product comprising instructions which, when the program of the computer program product is executed by a control device, cause the control device to perform the steps of the method according to the preceding aspect of the present disclosure. In particular, the control device comprises the monitoring device. In one configuration, the control device comprises a processor and a memory. The program is usually stored in the memory, i.e., instructions or a computer program code which can be stored in the memory. By means of process steps initiated by instructions, a determination or calculation can be realized, for example.

The invention claimed is:

1. A food processor comprising:
   a pot;
   a heating element for heating the pot and a food in the pot;
   a temperature sensor configured to detect a temperature of the pot; and
   a control device electrically connected to the heating element to provide energy to power the heating element, wherein the control device is electrically coupled to the temperature sensor to receive signals from the temperature sensor, and wherein the control device includes a monitoring device and is configured to provide to the monitoring device a temperature measurement value $T_{NTC}(k)$ indicating the temperature of the pot during a current monitoring cycle (k) and an electrical operating power measurement value u(k) indicating an amount of energy provided to the heating element during the current monitoring cycle (k), wherein the monitoring device is configured to
   determine, during the current monitoring cycle (k), that the food in the pot is boiling in response to an estimated disturbance variable value š(k+1) of a next monitoring cycle (k+1) being greater than zero, wherein the estimated disturbance variable value š(k+1) is indicative of a value of heat loss resulting from boiling of the food in the pot, wherein the next monitoring cycle (k+1) is a monitoring cycle immediately following the current monitoring cycle (k), and
   determine a steam rate of the food in the pot based on the estimated disturbance variable value š(k+1).

2. The food processor of claim 1, wherein the monitoring device is configured to determine that the food in the pot is not boiling in response to the estimated disturbance variable value š(k+1) approaching zero.

3. The food processor of claim 1, wherein the monitoring device is configured to determine a change in a predicted estimated temperature at a bottom of the pot value $\hat{T}^P_{SUR}(k)$ based on the electrical operating power measurement value u(k) and the estimated disturbance variable value š(k) of the current monitoring cycle (k).

4. The food processor of claim 3, wherein the monitoring device is configured to determine the estimated disturbance variable value š(k+1) of the next monitoring cycle (k+1) in temporally successive cycles.

5. The food processor of claim 4, wherein the monitoring device is configured to determine the estimated disturbance variable value š(k+1) of the next monitoring cycle (k+1) using as input variables the temperature measurement value $T_{NTC}(k)$ determined during the current monitoring cycle (k), the the electrical operating power measurement value u(k) determined during the current monitoring cycle (k), and the estimated disturbance variable value š(k) of the current monitoring cycle (k) determined during the previous monitoring cycle (k−1).

6. The food processor of claim 1, wherein the monitoring device is configured to output a plurality of predicted variables including at least one of a predicted disturbance variable, a predicted temperature measurement, a predicted pot temperature, and a predicted food temperature.

7. The food processor of claim 1, wherein the monitoring device is configured to determine at least one correction output variable corresponding to at least one of a correction disturbance variable, a correction temperature measurement, a correction pot temperature, and a correction food temperature.

8. The food processor of claim 1, wherein the monitoring device is configured to determine at least one estimated output variable corresponding to at least one of an estimated disturbance variable, an estimated temperature measurement, an estimated pot temperature, and an estimated food temperature.

9. The food processor of claim 8, wherein the monitoring device determines the at least one estimated output variable based on at least one of predicted output variables and correction output variables.

10. The food processor of claim 6, wherein the disturbance variable corresponds to a sum of the predicted disturbance variable and a correction disturbance variable.

11. The food processor of claim 7, wherein the disturbance variable corresponds to a sum of a predicted disturbance variable and the correction disturbance variable.

12. The food processor of claim 1, wherein the monitoring unit is configured to determine the steam rate of the food in the pot based on an amplitude of a signal of the estimated disturbance variable value $š(k+1)$, and wherein the steam rate is a rate of release of steam by the food in the pot per time unit.

13. The food processor of claim 12, wherein the monitoring unit is configured to determine the steam rate of the food in the pot using the amplitude of the signal of the estimated disturbance variable value $š(k+1)$ by means of a correlation such that the larger the amplitude, the higher the steam rate.

14. A food processor comprising:
a pot;
a heating element for heating the pot or a food in the pot;
temperature sensor configured to detect a temperature of the pot; and
a control device electrically connected to the heating element to provide energy to power the heating element, wherein the control device is electrically coupled to the temperature sensor to receive signals from the temperature sensor, and wherein the control device includes a monitoring device and is configured to provide to the monitoring device a temperature measurement value $T_{NTC}(k)$ indicating the temperature of the pot during a current monitoring cycle (k) and an electrical operating power measurement value u(k) indicating an amount of energy provided to the heating element during the current monitoring cycle (k), wherein the monitoring device is configured to determine, during the current monitoring cycle (k), that the food in the pot is boiling in response to an estimated disturbance variable value $š(k+1)$ of a next monitoring cycle (k+1) being greater than zero, wherein the estimated disturbance variable value $š(k+1)$ is indicative of a value of heat loss resulting from boiling of the food in the pot, wherein the next monitoring cycle (k+1) is a monitoring cycle immediately following the current monitoring cycle (k), wherein the estimated disturbance variable value $š(k+1)$ of the next monitoring cycle (k+1) is a sum of a predicted estimated disturbance variable value $š^P(k+1)$ of the next monitoring cycle (k+1) and a corrected estimated disturbance variable value $š^K(k+1)$ of the next monitoring cycle (k+1), wherein the predicted estimated disturbance variable value $š^P(k+1)$ is set to equal to an estimated disturbance variable value $š(k)$ of the current monitoring cycle (k) determined during a previous monitoring cycle (k−1), wherein the previous monitoring cycle (k−1) is a monitoring cycle immediately preceding the current monitoring cycle (k), wherein the corrected estimated disturbance variable value $š^K(k+1)$ is determined based on a difference between the temperature measurement value $T_{NTC}(k)$ and an estimated temperature measurement value $\hat{T}_{NTC}(k)$ of the current monitoring cycle (k) determined during the previous monitoring cycle (k−1), wherein the corrected estimated disturbance variable value $š^K(k+1)$ is determined based on a product of the difference and an adjustment coefficient (I).

* * * * *